INVENTOR:
RICHARD PFLUEGER
BY
ATT'YS

INVENTOR:
RICHARD PFLUEGER
BY

ATT'YS

INVENTOR:
RICHARD PFLUEGER 3,297,808
PROCESS FOR THE CONTINUOUS PRODUCTION OF RODS OR OTHER SECTIONS FROM THERMOPLASTICS
Richard Pflueger, Ludwigshafen (Rhine), Germany, assignor to Badische Anilin- & Soda-Fabrik Aktiengesellschaft, Ludwigshafen am Rhine, Germany
Filed Jan. 24, 1964, Ser. No. 340,086
Claims priority, application Germany, June 7, 1963, B 72.207
1 Claim. (Cl. 264—176)

This invention relates to the continuous production of elongated shapes, such as rods and sections from thermoplastics having a narrow range of fusion, for example polyamides having recurring carbonamide groups in the chain, polyolefins and polyacetals.

Figure 1:
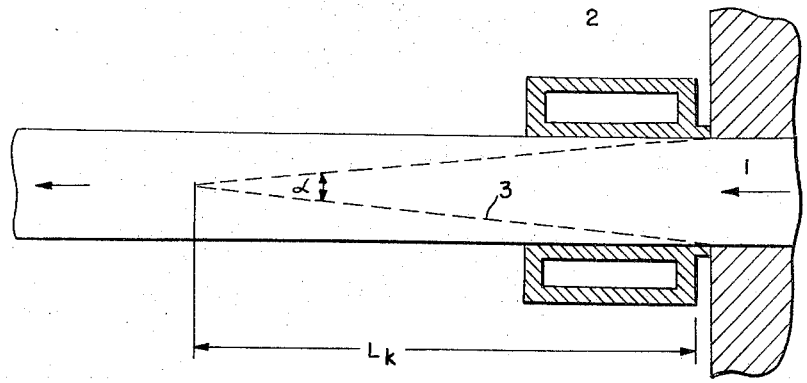

Owing to various properties of the said thermoplastics having a narrow range of fusion, it has been difficult to prepare rods or sections therefrom, particularly by a continuous process. These properties include the relatively sharp "melting point" and the relatively low viscosity in the molten state. FIGURE 1 of the accompanying drawings will be referred to to explain the processes in the production of molded articles by allowing melts of the said plastics to solidify continuously in a cooled molding apparatus. 1 indicates the melt supplied to the molding apparatus 2, and which solidifies in the outer zones. The liquid phase forms a cone 3 in the interior of the article, the angle $\alpha$ of the cone being the more obtuse the greater the rate of solidification of the melt and the slower the throughput rate (=draw-off rate) of the plastic. The production of sections from thermoplastics having a narrow range of fusion is particularly difficult in the case of molded articles which have large cross-sectional surfaces because the angle $\alpha$ of the molten cone becomes small at high draw-off speeds and also, when the melt is supplied to the molding apparatus under high pressure, it is difficult to avoid formation of bubbles and internal stresses reliably because the solidifying melt becomes too difficultly mobile in the narrow cone. It is therefore necessary to arrange for the draw-off rate of the shaped article formed to be such that the angle $\alpha$ of the molten cone is as large as possible. This is only possible however at low draw-off rates, i.e., low throughputs.

In a prior art method of this type, the molten plastic is continuously forced into shaping apparatus, and too high a frictional effect between the shaping tube and the molding is prevented by lubricating the shaping tube.

Another method for the continuous production of bubblefree rods of organic plastic forced through a cooled molding tube is known in which the necessary back pressure is produced by a ring of plastic formed owing to the cooling and forced against the wall of the mold by the pressure used. When using polyamides, the magnitude of the back pressure of the surface of the ring formed in the molding tube, which surface is in frictional engagement with the wall of the mold, is affected by variation in the cooling and/or molding pressure used.

According to another known method, rods, sections and tubes of thermoplastic materials are manufactured continuously in an extruder by carefully regulating the pressure and temperature of the melt and by using a connection between the supply pipe and the molding apparatus which consists of a material of low thermal conductivity.

Tubes and sections having large cross-sectional surfaces can only be prepared at relatively low draw-off rates when using the said methods.

It is an object of this invention to prepare bubble-free elongated shapes, e.g., rods, tubes and sections from thermoplastics having a narrow range of fusion by allowing them to solidify continuously.

Another object of this invention is to prepare elongated shapes of the said type which are free from stresses.

Yet another object of this invention is to increase the draw-off rate in the production of tubes, rods and sections having a large cross-sectional area.

It is also an object of this invention to prepare tubes, rods and sections which have a finely crystalline structure.

It is further an object of this invention to prepare tubes, rods and sections which, using conditions under which thermal degradation is substantially avoided.

These objects are achieved by supplying the molten thermoplastics to a cooled molding apparatus, allowing the melt to solidify externally and withdrawing the molded article formed, and stirring the molten cone in the interior of the externally solidified molded article.

The solidification period is shortened and gel formation is substantially prevented by the stirring of the melt in the molten cone. The rods and sections may therefore be prepared at a high speed without the formation of bubbles or appreciable internal stresses. Furthermore, stirring results in more rapid removal of heat. The sections, even those having large cross-sectional surfaces, are very homogeneous and have a finely crystalline structure. Furthermore thermally sensitive substances are degraded less than in prior art methods.

As used in this specification, the term "thermoplastics having a narrow range of fusion" means polyamides having recurring —CO—NH— groups in the chain, polyethylene, polypropylene, polyformaldehyde, and polymers of trioxane.

Polyamides having recurrent carbonamide groups in the chain which are suitable for the production of rods or sections according to this invention may be prepared by conventional methods, if desired in the presence of neutral or acid catalysts, from:

(1) Lactams having six to twelve ring carbon atoms, such as caprolactam, oenanthic lactam, capryllactam or laurolactam,
(2) Salts of diamines, such as hexamethylene diamine, octamethylene diamine, decamethylene diamine, bis-(4-aminocyclohexyl)methane, dodecamethylene diamine, 2,5-diaminotoluene, 1,4-diaminomethylcyclohexane, and dicarboxylic acids, such as adipic acid, suberic acid, sebacic acid, undecane dicarboxylic acid, heptadecane dicarboxylic acid,
(3) Diisocyanates, such as hexamethylene diisocyanate or toluylene diisocyanate, and diols, such as butanediol, hexanediol, and octanediol, and also mixtures of the compounds given under (1) and (2).

Suitable polyolefins are polyethylene having a density of 0.916 to 0.965, isotactic polypropylene, copolymers of ethylene and other olefins, which may be prepared by conventional methods.

Suitable polyacetals are particularly acetylated polyformaldehyde, copolymers of formaldehyde or trioxane with alkylene oxides, these polymers having a molecular weight of between 5,000 and 200,000.

Apparatus for allowing melts of thermoplastics having a narrow range of fusion to solidify continuously beginning from the outside in a molding apparatus capable of being cooled to which the molten thermoplastic is supplied comprises a rotatable flying shaft projecting into the molding apparatus and having at its unsupported end a coaxial stirrer which tapers inwardly in the direction of flow of the material.

The conveying means for supplying the molten thermoplastic may for example be an extruder capable of being heated and cooled by means of which the plastic can be fused and forced into the cooled mold under pressure. Melting units in which the melt is conveyed into the cooled mold by means of gear or piston pumps are also suitable.

For the production of rods or sections by means of a casting method which directs the melt into the molding apparatus practically without pressure, the melt is conveyed by means of pumps or the plastic is melted in a suitable container whose outlet opening is located higher than the opening of the cooled molding apparatus and allowed to flow into the molding apparatus. By casting I understand the production of rods or sections by means of a vertical cooled tube, the rod or section being drawn off by suitable means (see FIGURE 3 of the accompanying drawing).

Examples of molding apparatus capable of being cooled which may be used for the production of sections or rods are those known to be suitable for extrusion or casting of thermoplastics, for example molding tubes with and without vacuum calibration, i.e., calibration with a cooled tube. On the inner surface of the tube small holes are provided which are connected to a vacuum pump. In this way the polymer is into close contact with the cooled tube.

The rotatable shafts of the conveying means are constructed according to the type of conveying means used. If an extruder is used as the conveying means, it is advantageous to use a shaft constructed in the form of a screw whose thread pitch is adapted to the viscosity of the plastic to be processed. For thermoplastics having viscosities of about $5 \times 10^3$ to $1 \times 10^5$ poises, thread depths of 3 to 5 mm. are particularly suitable.

In the case of plastics whose melt viscosity is less than $10^4$ poises, radial play in the cylinder should not be more than 0.1 mm. because otherwise difficulties occur in conveyance. The unsupported part of the shaft may end immediately at the junction between the molding apparatus and the conveying means. It may however also project into the molten cone.

Suitable stirrers for effecting movement of the melt in the molten cone are: helices, wedge shaped blades, cones or preferably screw. In all cases, a stirrer is used which tapers inwardly in the direction in which the material flows. The stirrer preferably projects up to the point of the molten cone or wedge, or may also project only part of this distance. It is advantageous to adapt the shape of the stirrer substantially to the shape of the molten cone or wedge, according to the relationships explained earlier in this specification. The stirrer may be secured to the motor driven shaft either permanently, for example by welding, or detachably, for example by flange mounting or by screwing on. The stirrer is secured to the shaft so that the stirrer and shaft have the same axis.

When the molding apparatus capable of being cooled is attached to an extruder, a thermally insulating disc, for example of asbestos, may be used to prevent transfer of heat between the molding apparatus and the cylinder head. It is also possible to decrease the cross-section of the steel at the joint between the molding apparatus and the cylinder head.

Conventional means, for example pairs of rollers or Caterpillars, are suitable for withdrawing the rod or section formed.

Figure 2:
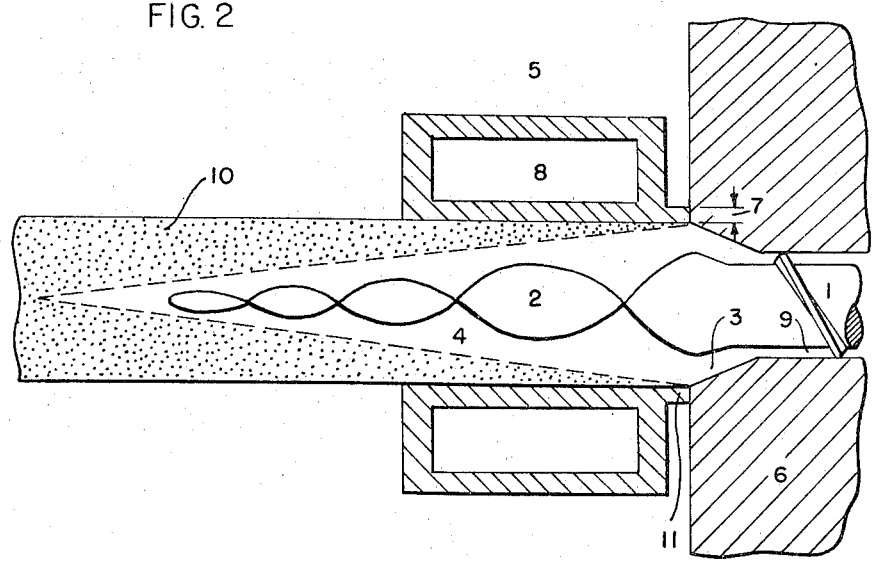

The invention will now be explained in greater detail with reference to FIGURE 2 of the accompanying drawings which shows an apparatus according to the invention for stirring the melt in the molten cone during the continuous production of rods or sections by allowing the melt to cool from the outside in a cooled molding apparatus and using an extruder as the conveying means. In the extruder, capable of being heated and cooled, the screw 1 is prolonged by a conical spiral 2 so that the melt 3 in the molten cone 4 is stirred as far as possible up to the apex of the cone. The molding apparatus 5, capable of being cooled, comprises a cylindrical tube having a cooling water jacket and is secured to the cylinder head 6 of the extruder. Heat transfer between the cylinder head and the molding apparatus is lessened by keeping the cross-section 7 of the steel at the joint as small as possible. It is preferable to use water or other conventional coolant as the cooling medium 8. 9 is a channel in the metering section of the extruder screw, 10 is the solidified shaped article and 11 is the transition to the cooled molding apparatus.

Figure 3:
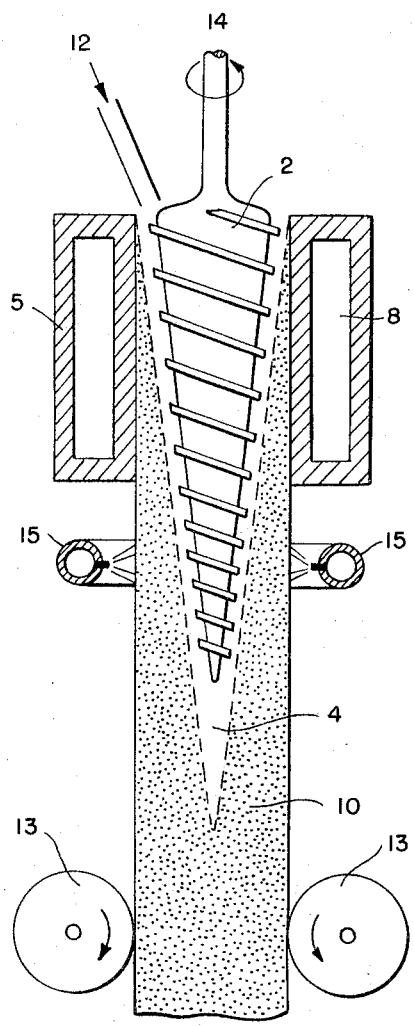
Figure 4:
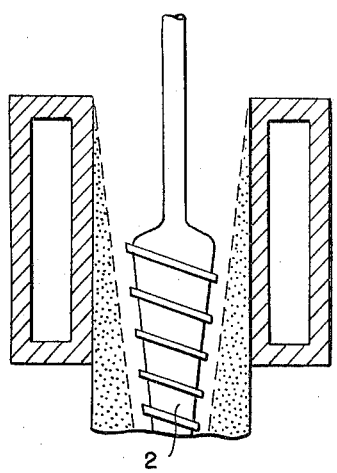
Figure 5:
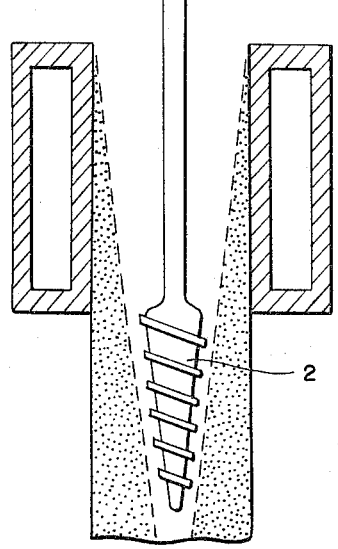

FIGURES 3 to 5 show other apparatus for carrying out the process according to the invention. Molten plastic is supplied through feed 12 into the vertically arranged molding apparatus 5, cooled by means of a cooling medium 8 and advantageously provided with bores for the production of subatmospheric pressure, and the solidified molded article 10 is drawn off by means of the pair of rollers 13 at a rate equivalent to the rate of formation. The molten cone 4 is stirred by means of the stirrer 2 secured to the shaft 14. 15 is an additional cooling means. In the simplest case it consists of an annular pipe having bores on the inner side from which cooling water flows. For the production of sections and rods by means of a preferred embodiment of apparatus according to this invention (FIGURE 2), the pressure and conveyance of the melt are regulated by correlating the molecular weight of the plastic being processed, the length and depth of the pumping zone of the screw and the rotary speed of the screw. Manometric pressure control and/or a pressure reduction valve are not necessary. Consequently expenditure for apparatus for carrying out the process according to this invention is small. It is advantageous to regulate the temperatures in the heating zones of the extruder cylinder to about ±2° C. The shaped article (rod or section) is not pulled away but is conducted by means of a pair of rollers at the predetermined speed which depends on the thickness of the layer and the type of plastic used. The speed of rotation of the screw is chosen so that the melt is forced into the molding apparatus under pressure and the externally solidified shaped article (rod or section) is forced from the molding apparatus. The working conditions in the continuous production of rods of 6-polyamide may be seen in FIGURE 6.

Figure 6:
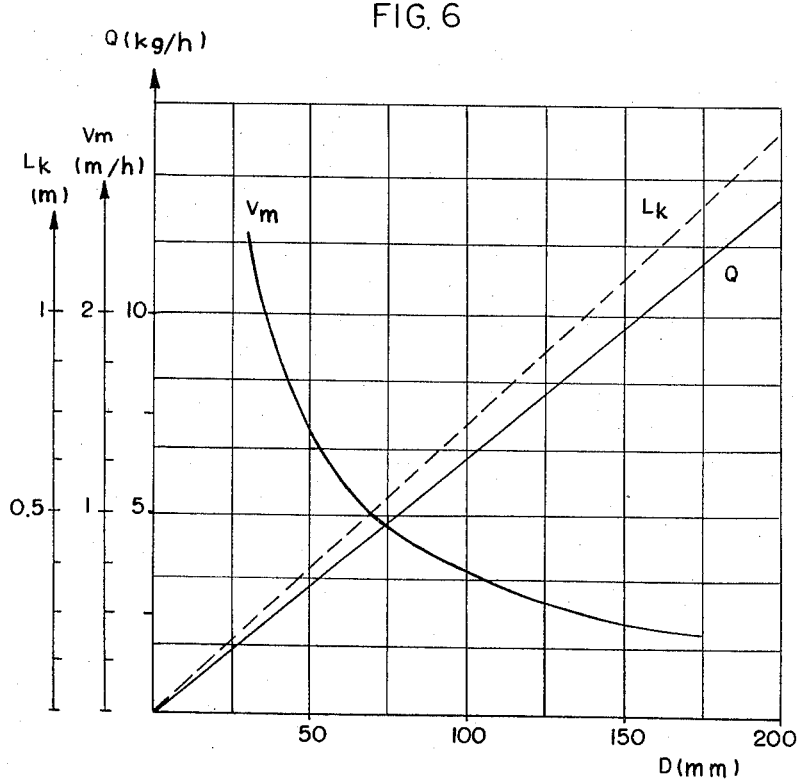

In FIGURE 6 the references have the following meanings:

$V_m$=maximum draw-off speed (m./h.)
$Q$=throughout (k./g.)
$L_c$=length of the molten cone (m.)
$D$=diameter of the rod (mm.).

Furthermore working conditions for the production of rods or sections from polyethylene or polyformaldehyde are given in Table 1 below.

For the production of sections by means of the casting method, the apparatus previously described and illustrated in FIGURES 3 to 5 is suitable. The melt is supplied through the feed 12 to the vertical cooling die 5 (molding apparatus) practically without pressure. When starting production, a section having the cross-sectional shape of the die 5 and a central conical cavity is passed upwardly into the die 5 and secured by means of the draw-off device 13. A conical screw 2, which projects into the molten cone 4, is heated to the temperature of the melt before starting production. This screw moves the melt in the direction of the apex of the cone 4 in an amount in excess of that brought about by gravity. The conical screw 2 is secured to a motor-driven shaft. The shaped article 10 is drawn off by means of the draw-off means 13 at the rate at which the melt cools in the cooling die 5. Cooling of the section may be enhanced by spraying it with water by means of the device 15 arranged beneath the cooled die 5.

Conditions for extrusion according to the invention and extrusion without stirring are described in the following Table 1 for 6-polyamide, 6,6-polyamide, polyethylene and polyformaldehyde (polyacetal). As may be seen from the values for production speed and size of spherolites in the methods compared, the method according to this invention is clearly superior. A cooling die is used as the molding apparatus.

*Table 1*

| Polymer | 6-polyamide | 6,6-polyamide | Polyethylene | Polyformaldehyde |
|---|---|---|---|---|
| Mean molecular weight ($M_n$) | ca. 30,000 | ca. 25,000 | >200,000 | 50-100,000 |
| Screw diameter mm | 45 | 45 | 45 | 45 |
| Screw length (D) | 15 | 15 | 15 | 15 |
| Length of pump zone (D) | 7 | 7 | 5 | 5 |
| Thread depth of pump zone, mm | 2.0 | 1.8 | 2.0 | 2.0 |
| Speed of screw min.$^{-1}$ | 40 | 25 | 20 | 20 |
| Temperature of stock °C | 240 | 275 | 200 | 195 |
| Diameter of cooling die, mm | 100 | 60 | 60 | 60 |
| Length of cooling die, mm | 200 | 150 | 150 | 150 |
| Speed m./h. without stirring | 0.65 | 0.8 | 0.9 | 0.7 |
| With stirring | 1.0 | 1.1 | 1.2 | 1.0 |
| Spherolite size (microns): | | | | |
| Without stirring | ca. 50 | ca. 60 | | |
| With stirring | <10 | <15 | | |

The following Table 2 gives the conditions for the production of shaped articles (rods or sections) from 6-polyamide by means of the casting method with and without the improvement according to this invention.

*Table 2*

| | |
|---|---|
| Mean molecular weight ($M_n$) | 30,000 |
| Temperature of the melt (°C.) | 230 |
| Diameter of cooling die (mm.) | 50 |
| Length of stirring member (mm.) | 250 |
| Draw-off rate (m./h.): | |
| Without stirring | 1.1 |
| With stirring | 1.4 |

I claim:

In a process for the continuous molding of elongated shapes using thermoplastics selected from the group consisting of polyamides having recurring —CONH—groups in the chain, polyethylene, polypropylene, polyformaldehyde and polymers of trioxane by passing the molten thermoplastic through a cooled molding apparatus and allowing said thermoplastic to progressively solidfy in said molding apparatus by heat transfer through the wall of said molding apparatus the improvement which comprises stirring the molten cone forming in the interior of the externally solidified shaped article.

References Cited by the Examiner

UNITED STATES PATENTS

| | | | |
|---|---|---|---|
| 2,353,825 | 2/1942 | Hofmann. | |
| 2,719,330 | 10/1955 | Stott | 264—176 |
| 2,789,313 | 4/1957 | Knowles. | |
| 2,867,004 | 1/1959 | Levison et al. | 264—176 |
| 3,068,513 | 12/1962 | Chaffin | 264—176 |
| 3,143,584 | 4/1964 | Roberts et al. | 264—176 |

ALEXANDER H. BRODMERKEL, *Primary Examiner.*

J. H. WOO, *Assistant Examiner.*

UNITED STATES PATENT OFFICE
CERTIFICATE OF CORRECTION

Patent No. 3,297,808                                    January 10, 1967

Richard Pflueger

It is hereby certified that error appears in the above numbered patent requiring correction and that the said Letters Patent should read as corrected below.

Columns 5 and 6, Table I, under the heading "Polymer", line 7 thereof, for "Speed of screw min.$2^1$" read -- Speed of screw min.$^{-1}$ --.

Signed and sealed this 24th day of October 1967.

(SEAL)
Attest:

Edward M. Fletcher, Jr.                                  EDWARD J. BRENNER
Attesting Officer                                              Commissioner of Patents